April 8, 1952  L. S. WILLIAMS  2,592,500
WEIGHING SCALE PENDULUM
Filed May 23, 1946  5 Sheets-Sheet 1
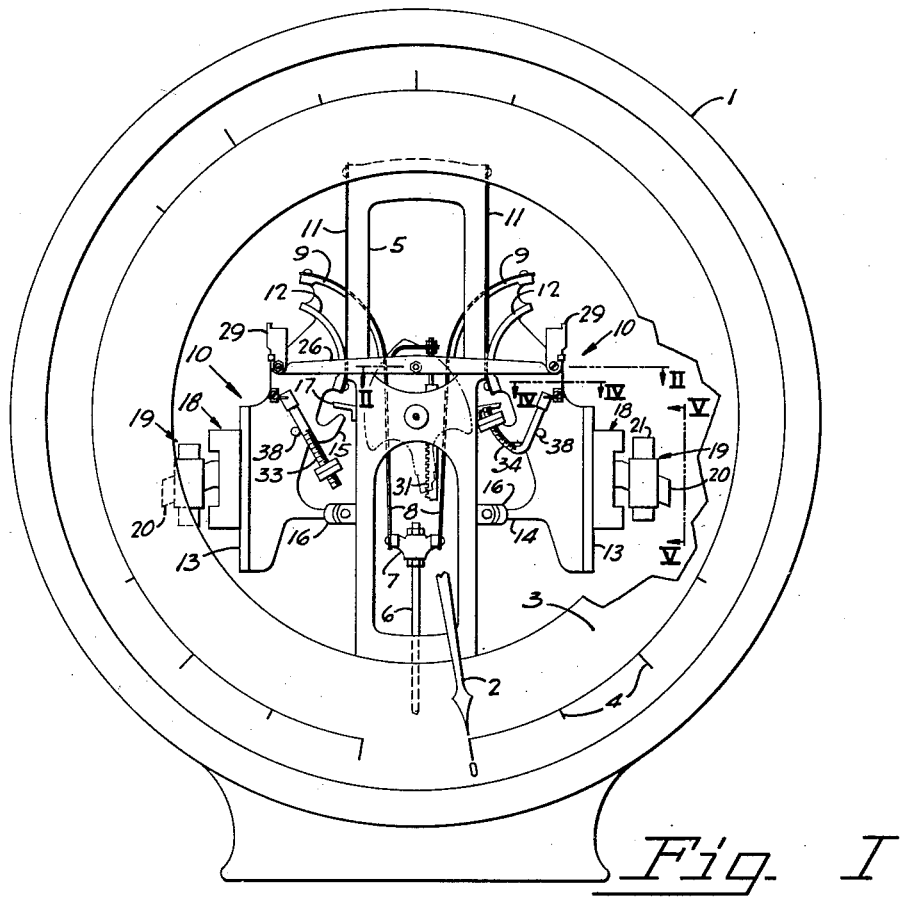
Fig. I
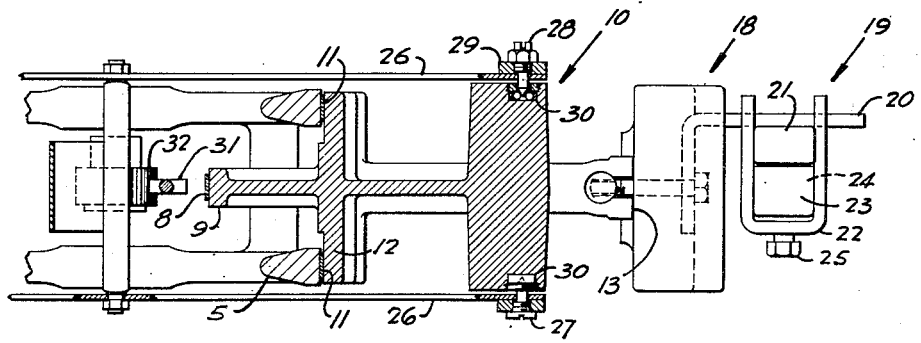
Fig. II
INVENTOR.
Lawrence S. Williams
BY
Marshall and Marshall
ATTORNEYS

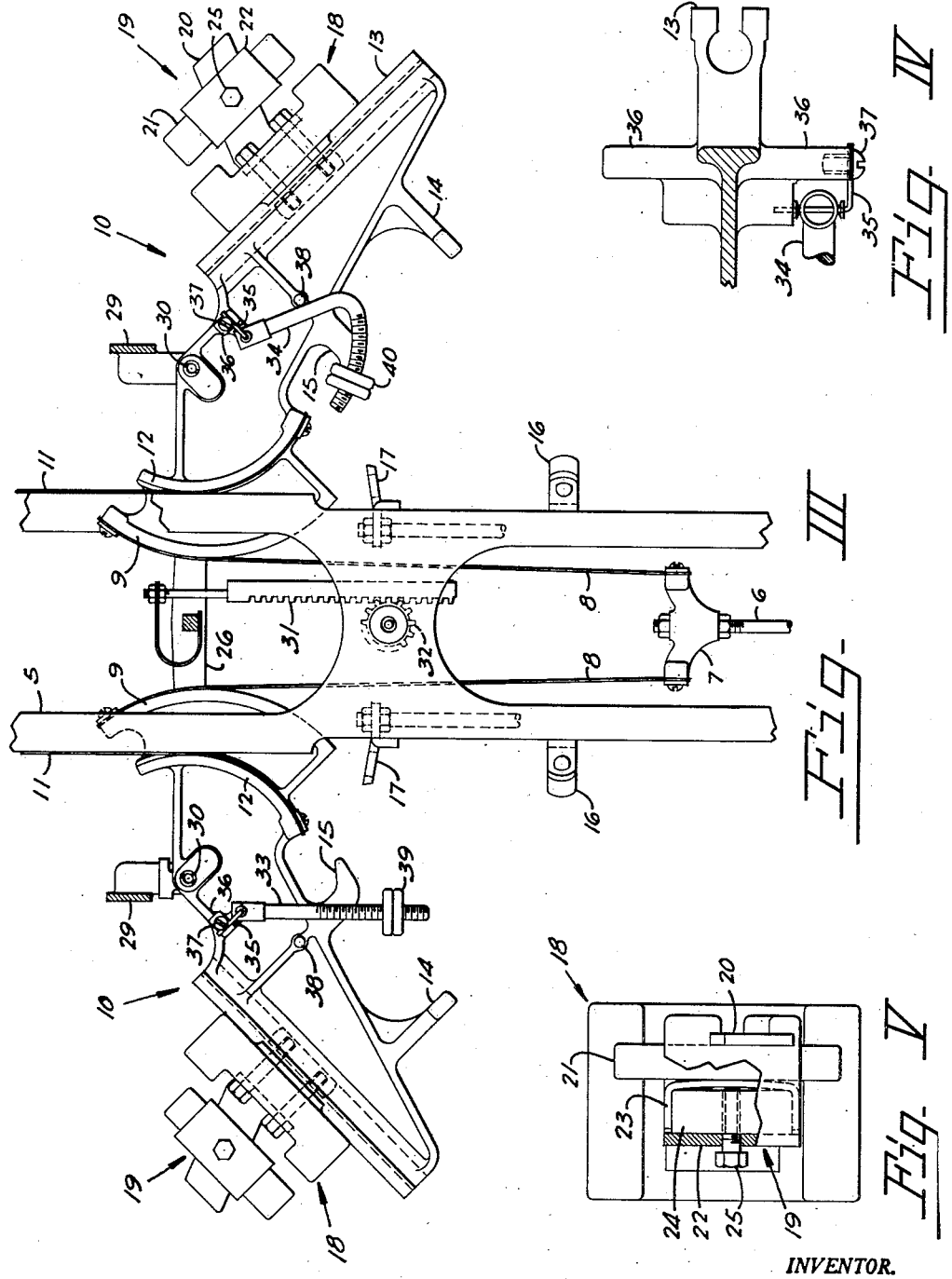

April 8, 1952 — L. S. WILLIAMS — 2,592,500
WEIGHING SCALE PENDULUM
Filed May 23, 1946 — 5 Sheets-Sheet 3
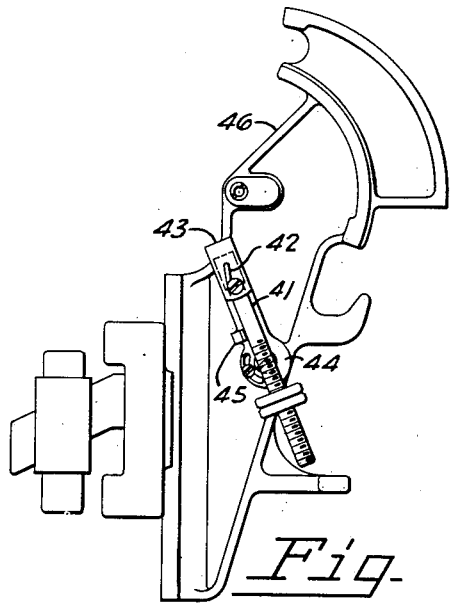
Fig. VI
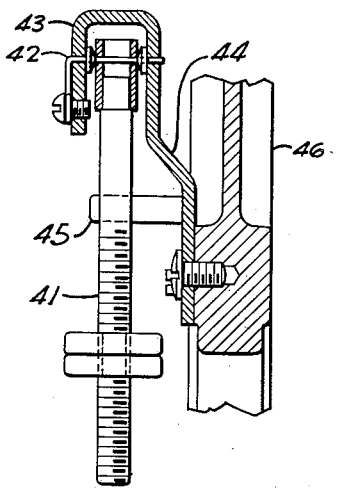
Fig. VII
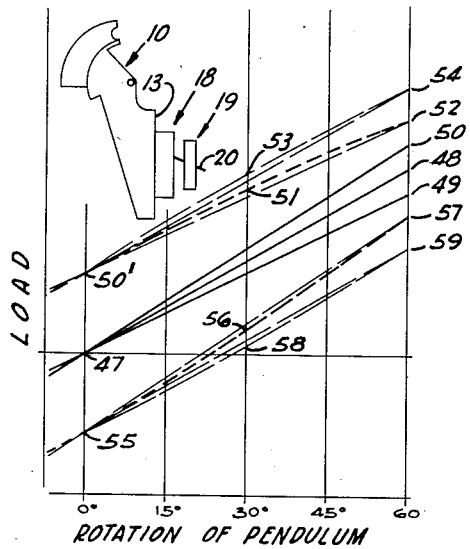
Fig. VIII
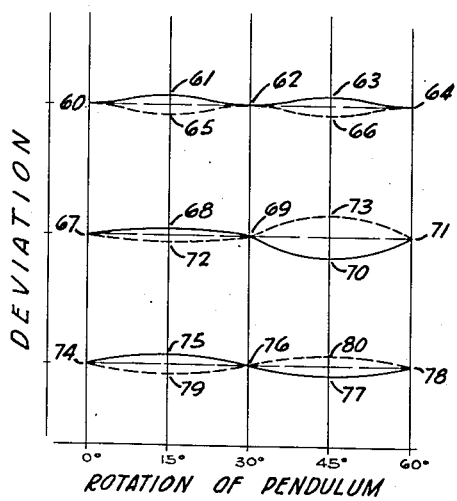
Fig. IX
INVENTOR.
Lawrence S. Williams
BY
Marshall and Marshall
ATTORNEYS

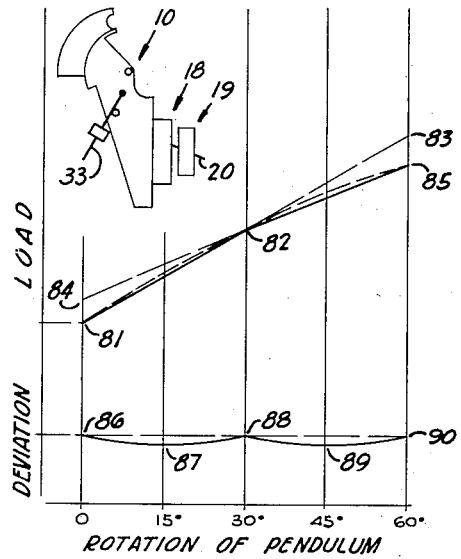
Fig. X
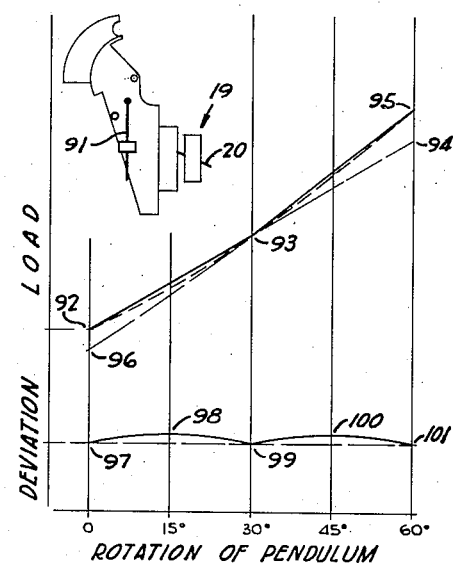
Fig. XI
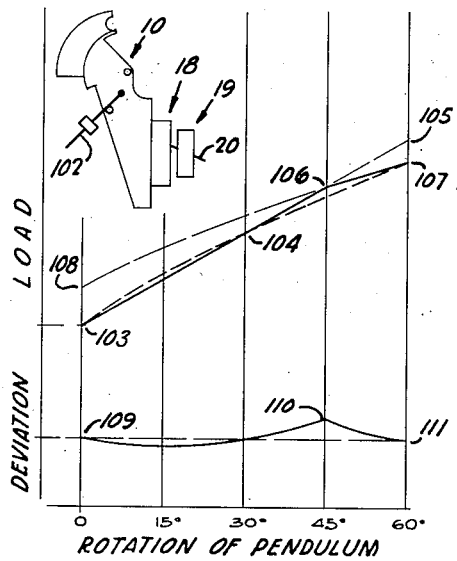
Fig. XII
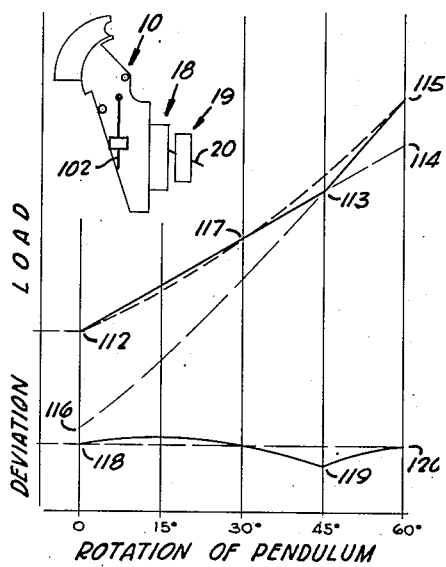
Fig. XIII
INVENTOR.
Lawrence S. Williams
BY
Marshall and Marshall
ATTORNEYS April 8, 1952 L. S. WILLIAMS 2,592,500
WEIGHING SCALE PENDULUM
Filed May 23, 1946 5 Sheets-Sheet 5
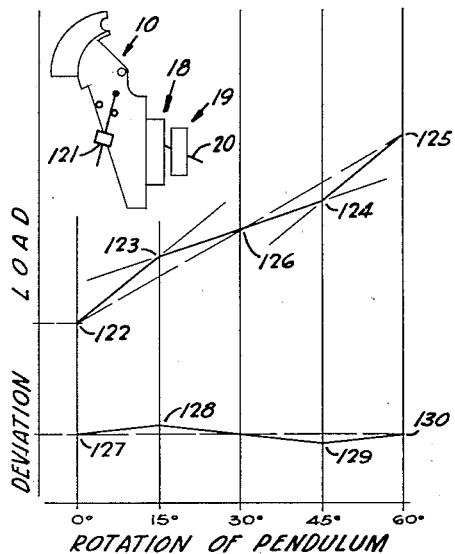
Fig. XIV
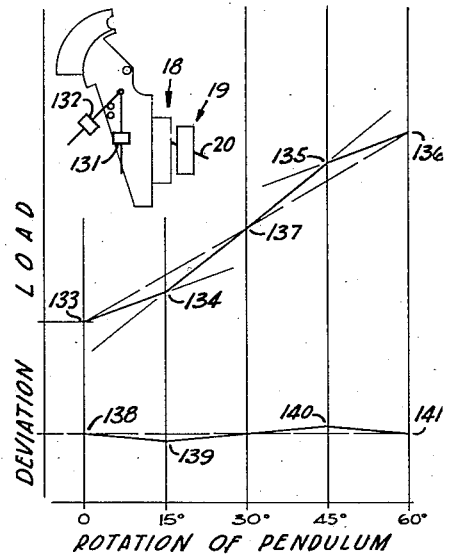
Fig. XV
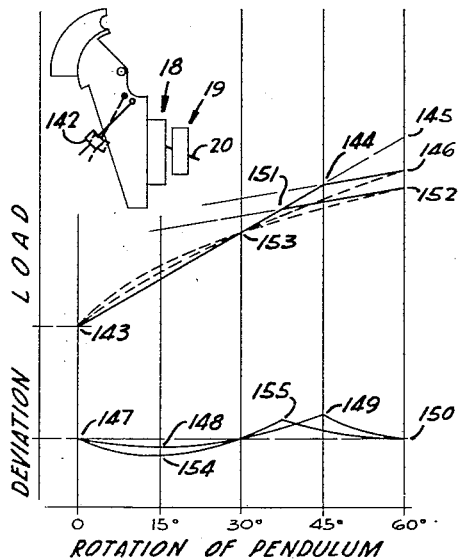
Fig. XVI
INVENTOR.
Lawrence S. Williams
BY
Marshall and Marshall
ATTORNEYS Patented Apr. 8, 1952

2,592,500

UNITED STATES PATENT OFFICE 2,592,500

WEIGHING SCALE PENDULUM

Lawrence S. Williams, Toledo, Ohio, assignor to Toledo Scale Company, Toledo, Ohio, a corporation of New Jersey Application May 23, 1946, Serial No. 671,830

13 Claims. (Cl. 265—62)

This invention relates to weighing scale pendulums and more particularly to auxiliary apparatus for securing a more nearly linear relation between loads being weighed and the angular rotation of the load counterbalancing pendulums.

It is common practice to apply load forces to a pendulum by means of a steel tape or ribbon overlying an arcuate surface of the pendulum. The shape of the arcuate surface to provide uniform chart graduations for equal increments of load is, in general, a spiral about the turning center of the pendulum. By suitable selection of the initial pull and the geometry of the pendulum, the exact spiral may be very closely approximated by the arc of a circle whose center is displaced from the turning center of the pendulum. Because a circle is the easiest curve to machine, practically all of the weighing scale pendulums in use employ an offset circular sector for the power arm of the pendulum.

Weighing scale pendulums constructed with circular arc power arms are usually provided with two adjustments whose function is to vary the position of the center of gravity of the pendulum with respect to the power arm and the turning center. The initial pull of the scale may in addition be adjusted by changing the load in a loading box. These three adjustments, two in the pendulum and one in the lever system, allow the scale to be adjusted to weigh correctly at three arbitrarily selected points. The points commonly selected are the zero, half capacity and full capacity graduations of the chart. When the scale is adjusted to indicate correctly at the three arbitrarily selected points it may still show some error at intermediate points. Scales in which the pendulum motion is used to drive an indicator around a circular dial through substantially 360 degrees of travel, use unbalanced weights on the indicator to secure further adjustment after the scale is calibrated to read correctly at zero, half and full capacity. While an unbalanced indicator permits the scale to be corrected at two additional points, it introduces additional friction into the mechanism connecting the indicator to the pendulums. This friction results because the indicator driving mechanism must be preloaded to remove all backlash and the preload must be sufficient to transmit the corrective force produced by the unbalance of the indicator. Furthermore, correction by indicator unbalance can not be used in scale equipment in which the indicator does not occupy the fixed relation with respect to the pendulums.

The principal object of this invention is to provide auxiliary mechanism that cooperates with a load counterbalancing pendulum in counterbalancing a load and which may be adjusted to eliminate the greater part of the error in indication remaining after the scale has been adjusted to indicate correctly at zero, half and full capacity.

Another object of the invention is to provide auxiliary pendulums to modify the force counterbalancing characteristic of weighing scale pendulums.

A still further object of the invention is to provide auxiliary pendulums for modifying the force counterbalancing characteristics of weighing scale pendulums with means for adjusting the magnitude of their effect on the weighing scale pendulums.

A still further object of the invention is to provide auxiliary pendulums operating between limits and suspended from the load counterbalancing pendulums of a weighing scale.

Yet another object of the invention is to provide auxiliary pendulums that may be suspended from weighing scale pendulums to effect a shift in the apparent center of gravity of the weighing scale pendulums during a portion of the travel of the weighing scale pendulum.

These and other objects and advantages are apparent from the following description in which reference is made to the accompanying drawings.

In the drawings:

Figure I is a rear elevation, with parts broken away, of load counterbalancing and indicating mechanism embodying the invention.

Figure II is a fragmentary horizontal section taken substantially along the line II—II of Figure I.

Figure III is an enlarged rear elevation of the load counterbalancing pendulums.

Figure IV is a fragmentary sectional view taken substantially along the line IV—IV of Figure I.

Figure V is a fragmentary side elevation taken along the line V—V of Figure I.

Figure VI is an elevation of one of the pendulums illustrating another method of mounting the auxiliary pendulums.

Figure VII is a sectional view of the modified auxiliary pendulum mounting.

Figure VIII is a graph illustrating the effect of varying the principal adjustments of the weighing scale pendulums.

Figure IX is a graph showing several deviation curves illustrating the common types of errors that remain after the scale has been adjusted to indicate correctly at zero, half and full capacity.

Figures X to XIII are graphs illustrating the effect of adding an auxiliary pendulum or pendle, having a single take off point, to a pendulum.

Figures XIV and XV illustrate effects which may be secured by using a single pendle operating between two take off points or by using two pendles, each having a single take off point.

Figure XVI is a graph illustrating the effect of varying the take off point of a pendle.

These specific figures and the accompanying description are intended merely to illustrate the invention, but not to impose limitations on the claims.

The addition of an auxiliary pendulum or pendle that is suspended from the load counterbalancing pendulum in position so that it is free during a portion of the travel of the load counterbalancing pendulum and is constrained to move with the pendulum during the remaining portion of travel, has the effect of suddenly shifting the center of gravity of the load counterbalancing pendulum through a small vertical distance when the pendle engages or leaves the stop that limits its motion. By suitably adjusting the size of the pendle, the point at which it swings free or is engaged, and the center of gravity of the load counterbalancing pendulum it is possible to improve the performance of a weighing scale pendulum. The size of the pendle and its point of engagement must be selected according to the type of error that it is to eliminate. The correction of error by means of pendles depends upon using the pendles to introduce an additional error into the scale which, when corrected by means of the adjustment of the center of gravity of the pendulums, leaves a remaining error that is less than the error without the pendles.

A load counterbalancing and indicating mechanism for a weighing scale embodying the invention is illustrated in the drawings. The mechanism is housed within a substantially watchcase-shaped housing 1 and includes an indicator 2 that sweeps over a chart 3 and cooperates with indicia 4 to indicate the magnitude of the load being counterbalanced.

The indicia 4 are arranged counterclockwise because Figure I shows the back side of a scale mechanism having front and back indication, the back indication being counterclockwise while the front indication is clockwise.

A sector guide 5, an open rectangular framework, is mounted vertically within the housing 1. The force of loads placed on a load receiver are transmitted through a steelyard rod 6 and yoke 7 to a pair of ribbons 8 attached to power sectors 9 of a pair of load counterbalancing pendulums 10. The load counterbalancing pendulums 10 are suspended from the sector guide 5 by means of steel ribbons 11 that are attached to the bottom ends of fulcrum sectors 12 and extending upwardly along the sides of the sector guide 5 are attached at its upper end. The pendulums 10 have, in addition to the power sectors 9 and fulcrum sectors 12, rectilinear tracks 13, bumper extensions 14 and locking horns 15. The bumper extensions 14 cooperate with bumpers 16 mounted on the sector guide 5 in position to limit the downward and inward travel of the pendulums. The upwardly directed locking horns 15 are in position, when the scale is at zero or no load, to be engaged by a locking mechanism including locking plates 17. Capacity adjusting weights 18 are mounted on the tracks 13 in position to provide approximately correct load counterbalancing capacity. Each of the major adjusting weights 18 includes minor adjusting weights 19 that are adjustable along inclined tracks 20 extending laterally from the major weights 18. Each of the minor weights 19 includes a subweight 21 which may be adjusted along a path parallel to the track 13. The minor weights 19 including the separately adjustable subweights 21 permit the centers of gravity of the pendulums to be easily and accurately adjusted with respect to the sectors.

The major weights 18 and the minor weights appear in more detail in Figures II and V. As seen in Figure II the minor weight 19 comprises a U-shaped bracket 22 whose legs are notched and slotted to fit over and slide along the inclined track 20. The subweight 21 is held against the track 20 between the legs of the U-shaped bracket 22 by a spring 23 that fits over a drilled and tapped nut 24. A screw 25 passing through a hole in the bottom of the U-shaped bracket 22 and threaded through the nut 24, serves to clamp the parts after they have been moved into their final adjusted positions. The spring 23 serves to frictionally hold the parts when the screw 25 is loosened to permit adjustment.

A pair of compensating bars 26 are carried on cone tipped screws 27 and 28 (Figure II) that are threaded through the lower ends of a U-shaped yoke 29. The inwardly directed tips of the screws 27 and 28 are journaled in ball bearings 30 mounted in the turning centers of the pendulums 10. A rack 31 suspended from the midpoints of the compensating bars 26 engages and drives a pinion 32 mounted on the indicator shaft. When loads are applied to the steelyard rod 6 the pendulums roll upwardly along the sector guide 5 through a distance that is proportional to the applied load. The compensating bars 26 carry the rack 31 upwardly through a distance that is equal to the average translation of the two pendulums and by meshing with the pinion on the indicator shaft drives the indicator through a corresponding angle.

Each of the pendulums 10 carries an auxiliary pendulum or pendle that is free to swing during a portion of the travel of the pendulum and that is constrained to move with the pendulum during another portion of its travel. The left-hand one of the pendulums, as seen in Figures I and III, carries a straight pendle 33 while the right-hand pendulum 10 carries a curved pendle 34. The pendles 33 and 34 are suspended from wire clips 35 secured in bosses 36 of the pendulums 10. The bosses 36 extend symmetrically from both sides of the pendulums 10 so that the symmetry and interchangeability of the pendulums is not affected. The laterally extending boss 36 (Figure IV) is stepped so that the wire clip 35 may be inserted into the face of one step with its outermost end secured under a screw 37 threaded into the other step of the boss 36. The pendle 33 or 34 is suspended from that portion of the wire clip 35 that extends between the steps. Each of the pendulums 10 has long slender bosses or stops 38 extending laterally from the pendulum body in position to engage the stems of the pendles 33 or 34 during a portion of the travel of the pendulums 10.

Figure I shows the load counterbalancing mechanism in its no load position with the pendulums counterbalancing the initial pull of the lever system. Figure III shows the pendulums in position to counterbalance a three-quarter capacity load. In Figure I the pendles 33 and 34 are each resting against their stops 38. As long as a pendle rests against its stop it moves bodily with the pendulum 10 and may be considered as part of the mass of the pendulum. When the load counterbalancing pendulums have reached the position shown in Figure III the pendle 33 has swung free from its stop 38, while the pendle 34 is just at the point of leaving its stop 38. As long as either pendle is swinging free from its stop its effect on the main pendulum is the same as if its mass were concentrated at its pivoting support. Therefore, the effect of the pendle on the load counterbalancing pendulum is to cause a certical shift in the center of gravity of the pendulum assembly as the pendle leaves or engages its stop.

The pendle 33 carries adjustable weights 39 so that the position of its center of gravity may be varied along its length, and thus provide adjustment of the magnitude of the vertical shift in the center of gravity of the load counterbalancing pendulum assembly. The pendle 34 has adjustable weights 40 movable along a path that is generally transverse to a line passed through the point of pivotal support and the center of gravity of the pendle. Adjustment of the weights 40 does not affect the magnitude of the vertical shift of the apparent center of gravity as the pendle is engaged by its stop, but does vary the point or phase in the load counterbalancing pendulum's motion at which the pendle is engaged. The adjustability of the weights 39 and 40 provides two more independent adjustments for the weighing scale and these adjustments may be combined with the three already provided, i. e. the initial pull and the positions of the minor weight 19 and subweight 21, to permit the scale to be adjusted for correct indication at five arbitrarily selected points distributed throughout its weighing range. It is common practice to uniformly space the points at which correct indication is obtained, i. e. to locate the points at the zero, one-quarter, one-half, three-quarter and full capacity graduations.

Figures VI and VII illustrate a modified form of pendle mounting that permits certain adjustments of the pendle to be made without affecting the performance of the pendulum through that portion of travel during which the pendle is engaged by its stop. According to this modification a pendle 41 is pivotally supported from a wire clip 42 that spans the space between the sides of a U-shaped portion 43 of a pendle mounting bracket 44. The bracket 44 includes a turned-up portion 45 serving as a stop for the pendle 41. The bracket 44 is secured to the side of a load counterbalancing pendulum 46 at a point that is substantially in line with the center of gravity of the combination of the pendle 41 and bracket 44. This construction permits the phase of the pendle to be adjusted without altering the adjustment of the weighing scale pendulum because the assembly is rotated about its center of gravity.

*Operation*

The effect of making the primary adjustments, i. e. the adjustment of the initial pull, the position of the weight 18 or the subweight 21 along the track 13 or the movement of the minor weight assembly 19 along the track 20, is illustrated in Figure VIII. If the pendulums are correctly adjusted and there are no remaining errors when the scale indicates correctly at zero, half and full capacity, its weighing characteristic may be represented by the line 47—48 of Figure VIII. This line is perfectly straight throughout the full weighing range. If the weight 18 is moved upwardly along the track 13, the load counterbalancing capacity of the pendulum is reduced. Since the track 13 is vertical at zero the movement of the weight 18 will not affect the initial or zero position counterbalancing ability of the pendulum, i. e. the zero indication will be unaffected by movement of the weight 18. If the track 13 is properly located with respect to the sectors the movement of the weight 18 will not introduce any curvature into the weighing characteristic. Therefore, after the weight 18 has been moved upwardly the pendulum characteristic may be represented by the line 47—49. Likewise, if the weight 18 is moved downwardly along the track 13, the load counterbalancing capacity is increased so that the load versus pendulum rotation may be represented by the line 47—50. The initial load or zero indication of the scale may, of course be adjusted at any time by the addition or removal of material from a loading box formed as a part of one of the levers or suspended from one of the levers of the scale.

If the minor weight assembly 19 is moved outwardly along a path perpendicular to the track 13, the initial pull of the pendulum is increased and the linearity of its characteristic curve is also affected. Since the increase in pull resulting from such a shift of the weight 19 is greatest at zero and is increasingly less at half and full capacity, a movement of the weight along a path perpendicular to the track 13 produces both curvature of the weighing characteristic and a change in slope as represented by the curved line 50'—51—52. The full scale indication may be increased to correspond to the change at zero by lowering the weight 19 parallel to the track 13 without affecting the zero indication. The slope of the track 20 automatically provides this compensation so that as the weight 19 is moved outwardly along the inclined track 20, the weighing characteristic of the pendulum changes from the straight line 47—48 to the curved line 50'—53—54, whose chord 50'—54 is parallel to the line 47—48. Therefore, the effect of moving the weight 19 out along the track 20 is to produce a greater increase in counterbalancing capacity at half capacity than is introduced at zero or full capacity. The excess in pull gained at half capacity is approximately one-tenth of the change in pull as represented by the distances 47—50' or 48—54. Operation of a scale along the curve 50'—53—54 gives what is commonly called a "slow" scale, i. e. the load at half capacity is greater than the indicated load.

If the minor weight 19 had been moved directly toward the track 13, the weighing characteristic would have been changed from the line 47—48 to the curve 55—56—57, while if the weight 19 is moved toward the pendulum along the inclined track 20, the weighing characteristic changes from the line 47—48 to the curve 55—58—59 and the scale is said to be fast at half capacity because the indicated load at half capacity is greater than the actual load applied to the scale.

It is to be understood that when adjustments of the minor weight 19 along the inclined track 20 are made, corresponding adjustments of the initial pull of the scale by changing the load in a loading box or some similar mechanism are also made so that the points 50' or 55 will be brought into coincidence with the points 47 at which time the points 54 or 59 will likewise be brought into coincidence with the point 48.

Thus, in adjusting the scale, the indication is first corrected at zero by the application of initial load, then the scale is loaded to capacity and the indication is corrected by adjustment of the weights along the track 13. The load is then reduced to half capacity and the indication noted. If the indication is fast, that is, the characteristic is represented by the line 55—58—59, it may be corrected by moving the minor weights 19 outwardly along the inclined track 20 until the indication is changed approximately ten times the obstrved error. Adjustment of the initial pull to translate the whole curve will then give substantially correct indications at zero, half and full.

In an actual weighing scale employing pendulums similar to those illustrated, the indications will not be correct throughout the weighing range even though they are adjusted to be exact at the zero, half and full capacity graduations. Depending upon the design of the pendulum, manufacturing tolerances, and incidental variations, the resulting performance characteristics may take several forms. Commonly encountered deviation curves are illustrated in Figure IX. The curved line 60—61—62—63—64 represents the weighing characteristic of a scale that is slow at the first and third-quarter when it is adjusted for correct indication at zero, at half and at full. The dotted line 60—65—62—66—64 represents a weighing characteristic that is fast at both of the quarters.

Instead of having the quarters going fast or slow at the same time, it often happens that one quarter goes fast and the other goes slow in unequal amounts. This type of deviation curve is illustrated by the line 67—68—69—70—71 or its counterpart, the dotted line 67—72—69—73—71. In this general characteristic it occasionally happens that the first and third quarters errors are equal in magnitude although opposite in sign. The lower set of curves in Figure IX illustrate this condition. Thus, the curve 74—75—76—77—78 illustrates the characteristic deviation of a scale that is slow in the first quarter and fast in the third quarter, while the dotted line 74—79—76—80—78 shows the reverse condition.

In the past it has been common practice to correct these errors, insofar as possible, by unbalancing the indicator so that the moment of the indicator reacting back on the pendulums modifies their position under the given load to secure substantially correct indication. Thus a characteristic similar to that illustrated by the line 74—75—76—77—78 is corrected by unbalancing the indicator along its length (vertical at zero, half and full capacity) because such unbalance is effective at the quarters when the indicator is horizontal and produces no moment at zero, half or full capacity when the indicator is vertical. When the quarters errors are in the same direction as illustrated by the line 60—61—62—63—64 the indicator must be unbalanced transversely to its length and the resulting curve combined with an adjustment of the minor weight 19 and the initial pull. The individual effects are that the indicator unbalance causes the zero and full scale indication to shift in one direction and the half capacity indication to shift in the opposite direction by a substantially equal amount. Change in the initial pull to secure correct zero and full capacity indications throws all of the error at half capacity. Thus, a resulting curve similar to the curves 50—53—54 or 55—58—59 results which is straightened by shifting the weight 19 along the track 20 and making a further correction in the initial pull.

When the errors at the quarters are unequal in amount and of the same or opposite sign, it is necessary to unbalance the indicator along both axes in order to correct the indication. This follows because a curve similar to the error curve 67—68—69—70—71 may be resolved into two curves one similar to the curve 60—65—62—66—64 and the other similar to the curve 74—75—76—77—78. Adding the two component curves gives a small error at the first quarter and a larger error at the third quarter. Since the components can be corrected indvidually their sum can also be corrected. However, as was pointed out earlier, unbalancing the indicator is not a completely satisfactory method of correction because of the additional preload required in the indicator driving mechanism to insure complete elimination of backlash. The increased preload has the effect of increasing the friction in the mechanism and thus reducing the accuracy of the indication.

Errors in pendulum scale indications indicated by the deviation curves of Figure IX may be substantially eliminated through the addition and proper adjustment of pendles to the pendulums. Figure X illustrates the characteristics of a pendulum having a pendle that is released or engaged as the pendulum passes its half capacity position. As long as the pendle is not engaged by its stop, its mass, as far as the pendulum 10 is concerned, may be considered as concentrated at its point of pivotal support. As soon as the pendle is engaged by its stop and is, therefore constrained to move with the pendulum, its mass as far as the pendulum is concerned shifts to the center of gravity of the pendle. The net effect of the pendle is to shift the center of gravity of the pendulum vertically through a small distance as the pendle is engaged or released. The shift in the center of gravity is between two definite points and the pendulum may be adjusted to a straight line weighing characteristic for either of the points, but in general not for both. The exception to the rule occurs if the pendle is engaged or disengaged when the track 13 is vertical.

In Figure X the pendulum may be considered as adjusted for straight line operation along the segment 81—82 of the line 81—82—83. When the pendle 33 becomes free at half capacity the effect is to shift the apparent mass of the pendle 33 upwardly through a short distance. As far as the pendulum is concerned this is equivalent to moving the weight 18 upwardly along the track 13 a short distance and moving the minor weight 19 out along the track 20. The result is to change the weighing characteristic of the pendulum from the line 81—82—83 corresponding to the line 47—48 of Figure VIII to a line 84—82—85 corresponding to the line 50'—53—54, except for having a lesser slope. Since the shift in the center of gravity is predominately in the direction of the track 13, the principal effect is to decrease the slope of the line 81—82—83 without introducing substantial curvature. Thus, the segment 82—85 of the line 84—82—85 is nearly straight. If the pendulum and pendle combination is adjusted to indicate correctly at the zero and full capacity graduations, the points 81 and 85, the actual load at half capacity will be greater than the indicated load, i. e. the scale is slow at half capacity corresponding to the curve 50'—53—54 of Figure VIII. However, the line segments 50'—53 and 53—54 of Figure VIII are curved lines, while the segments 81—82 and 82—85 are substantially straight lines.

Therefore, if the bent line 81—82—85 corresponding to the curve 50'—53—54 is corrected by moving the minor adjusting weight 19 in along the track (a correction that would straighten the curved line 50'—53—54) a deviation curve 86—87—88—89—90 represented by the difference between a curve similar to the curve 50'—53—54 drawn through the points 81, 82, 85 and the line segments 81—82 and 82—85 results. This deviation curve, the curved line 86—90, is of the same shape and opposite in sign to the deviation curve 60—61—62—63—64 of Figure IX and is, therefore, suitable for use as a correction in a scale exhibiting a characteristic similar to the latter line.

If the adjusting weights on the pendle 33 are raised or lowered, the shift in the center of gravity of the pendulum will be similarly affected and thus the magnitude of the deviation of the points 87, 89 from a straight line through the points 86, 88, 90 may be adjusted.

If the pendle is free during the first portion of the pendulum travel, i. e. from zero to half capacity, and is engaged at the start of the second half of the travel, the center of gravity is moved downwardly at half capacity so that the slope of the second half of the weighing characteristic is greater than the first half. Thus, in Figure XI, a pendle 91 that is engaged at half capacity, produces a weighing characteristic represented by a segment 92—93 of the line 92—93—94 during the first half of the weighing range and by a segment 93—95 of the line 96—93—95 during the second half of the weighing range. A curve drawn through the points 92, 93, 95 corresponds in shape to the curve 55—58—59 of Figure VIII. When the points 92, 93, 95 are brought into alignment by an outward adjustment of the weight 19 along the track 20, a deviation curve 97—98—99—100—101 results. The net effect of adding a pendle that is engaged at half capacity and making the corresponding adjustment in the position of the minor weight 19 and the initial pull has the effect of making the scale go slow at the first and third quarters, a condition which may be used to correct an error curve similar to the line 60—65—62—66—64 of Figure IX.

If the point of release of the pendle is delayed until the pendulum reaches the three-quarters capacity position an entirely different shape of deviation curve results. In Figure XII a pendle 102 that is released at the third-quarter is illustrated. As long as the pendle is engaged by its stop the pendulum operates along a straight characteristic curve, the straight line 103—104—105. At three-quarters capacity, at point 106 of the line 103—105, the pendle 102 swings free from its stop thus shifting the center of gravity of the pendulum upwardly so that during the remainder of its travel it operates along the segment 106—107 of the curve 108—106—107. If the weight 18 is shifted upwardly so that the indication is correct at zero, the point 103, and at full capacity, the point 107, the indication will be slow at half capacity and still slower at the third quarter. This corresponds approximately to a condition similar to the curve 50—53—54 of Figure VIII. The dotted curve of Figure XII, the curve 103—104—107, is the characteristic curve of the pendulum when it is adjusted to indicate correctly at the three points. If the three points are brought into alignment by shifting the minor weight 19 inwardly toward the pendulum along the track 20, the dotted curve 103—104—107 becomes a straight line and the scale will then be fast in the first quarter and slow in the third quarter, according to a deviation curve 109—110—111. The deviation at the third quarter is approximately three times as great as and of opposite sign from the deviation at the first quarter. It will be noticed that this curve is very nearly equal and opposite in sign to the deviation curve 67—68—69—70—71 of Figure IX. The correspondence between the curves when one is used as a correction for the other is not exact because of the discontinuity of the point 110 which may be located at the maximum deviation point 70 of the error curve.

If the pendle is engaged at the third quarter instead of being released, a condition illustrated in Figure XIII where the pendle 102 is hanging free from its stop when the pendulum is at zero results and the deviation curve is reversed in sign. As long as the pendle 102 is hanging free the pendulum may be adjusted to operate along a straight segment 112—113 of a line 112—113—114. When the pendle is engaged the effective center of gravity of the pendulum is lowered so that for the remainder of its travel it operates along a segment 113—115 of a curve 116—113—115. If the minor weight 19 is shifted to bring the points 112, the half capacity indication 117 and the full capacity indication 115 into alignment, the resulting characteristic curve representing the performance of the pendulum is a deviation curve 118—119—120. The scale indication is slow at the first quarter and fast at the third quarter, a condition which may be used to correct an error of the type represented by the deviation curve 67—72—69—73—71 of Figure IX.

The magnitude of the opposite deviations at the quarters may be varied by adjusting the effective length of the pendle in the same manner that moving the weights 39 up and down along the pendle 33 varied the like deviations at the quarters. Allowing the pendle to be engaged or to swing free at the third quarter, produces opposite effects at the quarters while the pendle released at half capacity produces like effects at the quarters.

The deviation curve may be reversed about the half capacity point so as to make the maximum deviation occur at the first quarter instead of the third quarter, by moving the point of engagement or release to the first quarter. However, it has been found that with a pendulum designed so that the track 13 is vertical at zero that the third quarter error is usually greater than the first quarter error so that a pendle released at the third quarter is most effective in reducing the error in indication.

If a pendle 121 operating between a pair of stops is added to a pendulum, the resulting deviation curve takes a substantially different form. Thus, in Figure XIV the pendle 121 is engaged with one of the stops during the first quarter of the pendulum travel so that the pendulum operates along a segment 122—123 of a characteristic curve. At the first quarter, the point 123, the pendle swings free from its stop, thereby raising the effective center of gravity of the pendulum 19 so that from the first to the third quarter it operates along a segment 123—124 having a lesser slope than the segment 122—123. At the third quarter the pendle is engaged by the other stop so that it then operates along a segment 124—125. A point 126 on the segment 123—124 at half capacity may or may not lie on a straight line connecting the points 122 and 125. If the point 126 is out of alignment the minor weight 19 is moved along the track 20, one way or the other, to secure alignment of the points 122, 126 and 125. When these points are brought into alignment the scale is found to be slow at the first quarter and fast at the third quarter by approximately equal amounts, thus giving the deviation curve 127—128—129—130 of Figure XIV. This curve being generally equal and opposite to the deviation curve 74—79—76—80—78 of Figure IX may be used to correct that deviation curve. In this instance very little movement of the minor weight 19 is required because the high slope and low slope portions of the composite curve are approximately equally divided on either side of the half capacity point.

If it is desired to reverse the sign of the deviations at the quarters but still keep them equal in magnitude, it is necessary to use two pendles of equal magnitude, one of which is free from zero to the first quarter and the other of which is free from the third quarter to full capacity. Thus in Figure XV a pendle 131 is engaged at the first quarter and a pendle 132 is released at the third quarter. As long as the pendle 131 is free the pendulum operates along a segment 133—134, extending from zero to one-quarter capacity. At the first quarter, the point 134, the pendle 131 is engaged so that the pendulum then operates along a segment 134—135 of a steeper characteristic curve. At the third quarter, the point 135, the pendle 132 is released so that the pendulum operates along a flatter segment 135—136 for the remaining portion of its travel. Again the half capacity indication, the point 137, is very nearly in line with the zero and full capacity indications 133 and 136 respectively, so that very little movement of the minor weight 19 is required to secure correct zero, half and full scale indications. The differences between the segments 133—134, 134—135, and 135—136 and the straight line 133—136 gives a deviation curve 138—139—140—141, showing a fast first quarter and a slow third quarter indication. In these examples the magnitude of the deviations may be adjusted by varying either the weight of the pendle or the distance between its pivotal support and its center of gravity.

The foregoing examples illustrate the effect of adding pendles that are engaged or released at definite points. From Figures X and XI will be seen that adjustment of the magnitude of the pendle that is released or engaged at half capacity affects the quarters indications in about equal amounts and of the same sign. Thus the indications at the quarters are either advanced or retarded. Adjusting the magnitude of a pendle that is engaged or released at either quarter affects the quarters in opposite directions and affects one approximately three times as much as it does the other. Therefore, two pendles, one releasing at half capacity, and the other releasing at either the first or third quarter, may be used in combination with the regular pendulum adjustments to adjust the scale for correct indications at five points uniformly distributed throughout its weighing range.

If, instead of varying the magnitude of a pendle having fixed engagement and release points, the magnitude is kept constant and the release point is varied another type of adjustment is provided. Figure XVI illustrates the effect of varying the release point of a pendle 142. As long as the pendle 142 is engaged by its stop, the pendulum may be adjusted to operate along a segment 143—144 of a characteristic curve 143—145. When the pendle is released the operation shifts from the line 143—145 to another line 144—146, thus producing a fast indication at full capacity. This condition is exactly the same as that illustrated in Figure XII and yields a deviation curve 147—148—149—150. If the point of take off is advanced from the third quarter toward the half capacity position to a point 151 on the segment 143—144, without changing the weight or center of gravity position of the pendle, the operation beyond the release point is along the segment 151—152 that is generally parallel to the segment 144—146. The half capacity indication, the point 153, will be found to be more in error when the full scale indication is adjusted to the point 152 (the pendle being released at five-eighths capacity) than it was when the pendle was released at the third quarter. This means that the minor adjusting weight 19 must be moved further for the five-eighths release than for the third quarter release, i. e. the curve through the points 143, 153 and 152 has more curvature than the curve through the points 143, 153 and 146. Thus when the pendle is released at the five-eighths capacity point, it yields a deviation curve 147—154—155—150 that shows that the first quarter deviation has been increased and the third quarter deviation has been decreased by advancing the phase of the release. It should also be noted that when the release is near the third quarter, the effect of changing the release point is to increase the deviation at the first quarter faster than it reduces the deviation at the third quarter.

The principle of operation of the pendles and the result of adding a single pendle to a pendulum have been described and the resulting deviation curves shown. Two or more pendles may be added to a single pendulum, or where load counterbalancing pendulums are used in pairs as shown in Figures I and III, the pendles may be divided with one or more on each of the pendulums. Thus, to correct an error which may be resolved into two curves each of which is similar to one of the described pendle deviation curves, the two corresponding pendles may be added one to each of the pendulums. The result is essentially the same as if both pendles were added to one pendulum, because the two pendulums are interconnected through their common connection to the steelyard rod 6 and the indication is taken from the center of the compensating bars which average the unequalities of the pendulums between the pendulums as far as the indication is concerned.

As a practical matter, the pendles may be applied to a weighing scale in either of two methods. If two pendles whose magnitudes, i. e. either their weight or the distances of their centers of gravity from the pivot points are used with one of the pendles releasing or engaging at half capacity, and the other releasing or engaging at that quarter having the greater error are used, the quarters errors may be eliminated because adjustment of the pendle coming into play at half capacity affects the quarters in the same direction and in equal amounts, while the pendle coming into play at the quarter affects the quarters in unequal amounts and in opposite sign.

A second method of employing the pendles is to use one engaged or released at half capacity and adjustable in magnitude, and a second fixed in magnitude and releasable at an adjustable point near that quarter having the greater error. This latter method makes use of the half capacity pendle to adjust the quarters indication in the same direction and makes use of the variable phase pendle to secure the required difference in quarters indication.

If both the amplitude and point of release of each of two pendles is adjustable, it is theoretically possible to make the scale indicate correctly at seven points instead of the five ordinarily used. However, as a practical matter, a well constructed pendulum scale has such a small residual error after the indication has been corrected at five points, that the remaining errors may be neglected.

The addition of simple pendles to the pendulums of an automatic scale eliminates the need for unbalancing the indicator and, therefore, permits the use of much lower preloading forces in the indicator drive mechanism so that the scale performance is improved.

Various modifications and methods of adjusting auxiliary pendulums to modify the characteristics of weighing scale pendulums may be devised and the number of pendles that are employed may be varied to adapt the invention to various weighing scales without departing from the scope of the invention.

Having described my invention, I claim:

1. In a device of the class described, in combination, a first pendulum that serving as an automatic counterbalance for a weighing scale is operatively connected to a load receiver and to indicating mechanism, and a second pendulum that is pivotally supported from the first pendulum, said second pendulum being freely pendulous throughout a portion of the travel of the first pendulum and being engaged and moved with the first pendulum throughout another portion of the travel of the first pendulum.

2. In a device of the class described, in combination, a first pendulum that serving as an automatic counterbalance for a weighing scale is operatively connected to a load receiver and to indicating mechanism, a second pendulum that is pivotally supported from the first pendulum, said second pendulum being freely pendulous throughout a portion of the travel of the first pendulum and fixed stops on at least one of the pendulums arranged so that the second pendulum is engaged and moved with the first pendulum throughout another portion of the travel of the first pendulum, and weights supported on and movable transversely of the second pendulum for adjusting the point of engagement of the second pendulum to vary the length of the portion of travel of the first pendulum during which the pendulums are engaged.

3. In a device of the class described, in combination, a first pendulum serving as an automatic counterbalance for a weighing scale, a second pendulum that is pivotally supported on and moved with the first pendulum throughout a portion of its travel and means for adjusting the location of the center of gravity of the second pendulum.

4. In a device of the class described, in combination, a first pendulum serving as an automatic counterbalance for a weighing scale, a pair of integrally formed bosses extending laterally from the pendulum, and a second pendulum that is pivotally mounted from one boss and that rests against the other boss during a portion of the travel of the first pendulum.

5. In a device of the class described, in combination, a first pendulum serving as an automatic counterbalance for a weighing scale, a pair of integrally formed bosses extending laterally from the pendulum, a second pendulum that is pivotally mounted from one boss and that rests against the other boss during a portion of the travel of the first pendulum and means for shifting the center of gravity of the second pendulum.

6. In a device of the class described, in combination, a first pendulum serving as an automatic counterbalance for a weighing scale, a pair of integrally formed bosses extending laterally from the pendulum, a second pendulum that is pivotally mounted from one boss and that rests against the other boss during a portion of the travel of the first pendulum and means for shifting the center of gravity of the second pendulum along a line passing through its center of gravity and its pivoting point.

7. In a device of the class described, in combination, a first pendulum serving as an automatic counterbalance for a weighing scale, a pair of integrally formed bosses extending laterally from the pendulum, a second pendulum that is pivotally mounted from one boss and that rests against the other boss during a portion of the travel of the first pendulum and means for shifting the center of gravity of the second pendulum along a line generally perpendicular to a line passing through the center of gravity and the pivoting point of the second pendulum.

8. In a device of the class described, in combination, a first pendulum serving as an automatic counterbalance for a weighing scale, a bracket attached to the first pendulum, a second pendulum pivoted on the bracket, and a stop on the bracket for engaging the second pendulum during a portion of the travel of the first pendulum, said bracket being adjustable with respect to the first pendulum by rotation about an axis passing through the center of gravity of the bracket and engaged pendulum.

9. In a device of the class described, in combination, a first pendulum that serving as an automatic counterbalance for a weighing scale is operatively connected to a load receiver and to indicating mechanism, a second pendulum that is pivotally attached to the first pendulum at a point that is eccentric to the turning axis of the first pendulum, means limiting relative movement of the first pendulum with respect to the second, whereby said second pendulum is freely pendulous throughout a portion of the travel of the first pendulum and is engaged and moved as an integral portion of the first pendulum throughout another portion of the travel of the first pendulum.

10. In a device of the class described, in combination, a first pendulum that serving as an automatic counterbalance for a weighing scale is operatively connected to a load receiver and to indicating mechanism, a second pendulum that is pivotally attached to the first pendulum at a point that is eccentric to the turning axis of the first pendulum, said second pendulum being freely pendulous throughout a portion of the travel of the first pendulum, and means for adjusting the point of engagement of the second pendulum to vary the length of the portion of travel of the first pendulum during which the pendulums are engaged.

11. In a device of the class described, in combination, a first pendulum that serving as an automatic counterbalance for a weighing scale is operatively connected to a load receiver and to indicating mechanism, a second pendulum that is pivotally attached to the first pendulum at a point that is eccentric to the turning axis of the first pendulum, a stop on the first pendulum to limit the relative movement of the pendulums, said second pendulum being freely pendulous throughout a portion of the travel of the first pendulum, and means for adjusting the moment of the second pendulum.

12. In a device of the class described, in combination, a first pendulum serving as an automatic counterbalance for a weighing scale, a second pendulum that is pivotally attached to the first pendulum at a point eccentric to the turning axis of the first pendulum, a fixed abutment on the first pendulum for supporting the second pendulum so that said second pendulum is moved in contact with the abutment of the first pendulum throughout a portion of its travel and is freely pendulous throughout the remaining travel which portion is less than the total travel, and means for adjusting the location of the center of gravity of the second pendulum.

13. In a device of the class described, in combination, a first pendulum that serving as an automatic counterbalance for a weighing scale is operatively connected to a load receiver and to indicating mechanism, a second pendulum that is pivotally attached to the first pendulum at a point eccentric to the turning axis of the first pendulum and stops for limiting the travel of the second pendulum with respect to the first pendulum.

LAWRENCE S. WILLIAMS.

REFERENCES CITED

The following references are of record in the file of this patent:

UNITED STATES PATENTS

| Number | Name | Date |
|---|---|---|
| 910,646 | Culmer | Jan. 26, 1909 |
| 1,184,703 | Von Post | May 23, 1916 |
| 1,240,084 | Nilson | Sept. 11, 1917 |
| 1,454,089 | Ulrich | May 8, 1923 |